Patented Dec. 31, 1935

2,025,742

UNITED STATES PATENT OFFICE 2,025,742

LIGHT COLORED LIQUID CHLORINATED NAPHTHALENE AND PRODUCTION THEREOF

Ernest R. Hanson, Bloomfield, and Sandford Brown, Montclair, N. J., assignors to Halowax Corporation, New York, N. Y., a corporation of Delaware No Drawing. Application April 2, 1934, Serial No. 718,676

8 Claims. (Cl. 260—161)

This invention relates to the manufacture of liquid halogen substitution products of naphthalene.

The chlorine substitution products of naphthalene have various uses in the arts and are now most generally obtained by passing chlorine gas through the liquid or liquefied materials either in the absence or presence of a catalyst which assists the substitution of chlorine atoms for the hydrogen atoms in the ring. The crude liquid chlorinated products are a mixture of a number of chlorine compounds of the base material with impurities, and the oily masses are of a dark color bordering on black with an acid reaction. These and other characteristics decidedly limit the uses to which the materials can be put.

We have discovered that liquid water white materials which are also exceedingly pure and neutral in reaction, and applicable as plasticizers for films, may be obtained from the crudes by the simple expedient of distilling in a closed distilling system at a high vacuum preferably at pressures below 100 m. m. of mercury in the presence of a base. The process is especially adaptable to commercial practice because the treatment can be carried out in any of the usual forms of apparatus now on the market for fracitonal distillation.

The products which are liquid at ordinary room temperatures, for instance 20° C., are adaptable for use as plasticizers in various compositions for instance in films for cameras, varnishes, etc. but as heretofore produced their use has been limited because of their characteristics, for instance they give a cloudy effect to the composition when cooled to —5° C. if used in sufficient quantities. By distillation under materially reduced pressure as herein described, we have discovered that the cloudiness of these materials at low temperatures is overcome and they may be used in relatively large amounts, for instance in camera films, without causing such cloudiness on cold days that the clearness of the film is materially affected. Being water white they also do not color the transmitted light or disturb color values. By vacuum distillation it is possible to produce in one step products which are neutral, free of chlorides and free of cloud at low temperature whereas these characteristics could not be obtained under previous methods of distillation at atmospheric pressure.

For these chlorinated materials the product is chlorinated preferably by passing chlorine through the liquid base material until the crude chlorinated material has a specific gravity of less than 1.25 at 150° C. The crude chlorinated material is treated with lime, barium oxide, sodium hydroxide or other substances to neutralize the acid or to assist in the elimination and breaking up of unstable addition products. For products prepared in the usual commercial process with reasonable care about 1 to 2% of the base is sufficient but more or less may be used depending upon the amount and kind of free halogen acid or unstable product, to obtain a neutral final product.

We prefer that the product have a color lighter than 2 when compared in the manner of and with the Color glass standard described in Scientific Circular #367 of the American Paint & Varnish Manufacturers' Association. In brief, this test is made by dissolving the product in an equal weight of water-white toluol, placing the solution in a water-white glass tube having an inside diameter of approximately 10.6 mm., placing this in a test box containing a circular disc of color standards and then revolving the disc until the color of the sample and the color standard match. The color of the wax is then given the number of the color standard.

In carrying out the process, the still, for instance a horizontal, pipe, or flash still is charged with the treated product and heat is applied externally or internally. The vacuum is applied and the still pressure is reduced below 100 m. m. of mercury absolute pressure, preferably below 35 m. m. The temperatures of distillation will vary with the particular charge and the particular cut desired and also with the degree of vacuum obtained. The process in general is applicable to crudes chlorinated to give a distilled product having a chlorine content up to 30% chlorine.

*Example.*—Crude brownish-black liquid chlorinated naphthalene with a gravity of 1.15 to 1.16 at 150° C. was distilled in the presence of 1% of lime under a vacuum of 12 mm. of mercury absolute pressure and a fraction collected boiling between 87 and 117° C. The distilled product was a water-white liquid and had a specific gravity of 1.25 at 20° C. The product was neutral to litmus, had a chlorine content of 24–27%, dielectric constant of 5, dielectric strength of 324 volts per mil., power factor of 3% and a color of 1. It developed no cloudiness at —5° C.

From these experiments under greatly reduced pressure we have found that the pitchy residue remaining in the still and which can be disposed of only as low grade product, is greatly reduced in amount and a larger amount of the desired fraction is obtained. Under proper operation the yield will run up to 95%. The combination of increased yield together with white color, freedom from cloudiness at −5° C., chlorides, and acidity and close limits in range of halogen content is not obtainable from these materials by operating at atmospheric pressure.

During distillation, samples of the product are drawn off at intervals, and color and specific gravity determined. From the specific gravity one can estimate the halogen content. In addition to the light color, the low pressure enables the process to be so closely regulated when desired, that temperature fluctuation may be held in all instances to less than 5° C. on either side of the desired distillation temperature and in some instances to as little as 1°, with the result that products which have only an exceedingly slight variation in halogen content for instance plus or minus 1% can be obtained. In addition, the low temperature which we are enabled to use prevents in large measure the deterioration of the apparatus due to the chemical action of the products of pyrolysis of the materials, if processed under atmospheric pressure. The product can be freely handled without any irritation of the skin or injurious effects.

We claim:—

1. A method of obtaining white liquid chlorine substitution products of naphthalene, which comprises distilling a liquid impure chorinated naphthalene having a gravity of 1.25 or less at 150° C., carrying on the distillation at a low pressure of 35 m. m. of mercury or less, and collecting a fraction having a color lighter than 2 as described.

2. A method of obtaining liquid chlorine substitution products of naphthalene which are clear at low temperatures, comprising distilling an impure liquid chlorinated naphthalene having a gravity of 1.25 or less at 150° C., carrying on the distillation at a low pressure of 35 m. m. of mercury or less, and collecting a fraction which exhibits no cloudiness at −5° C.

3. A method of obtaining liquid chlorine substitution products of naphthalene, which comprises distilling a liquid impure chlorinated naphthalene having a gravity of 1.25 or less at 150° C., carrying on the distillation at a low pressure of 100 m. m. of mercury or less and collecting a fraction having a color lighter than 2 as described.

4. A method of obtaining liquid chlorine substitution products of naphthalene which are clear at low temperatures, comprising distilling an impure liquid chlorinated naphthalene having a gravity of 1.25 or less at 150° C., carrying on the distillation at a low pressure of 100 m. m. of mercury or less and collecting a fraction which exhibits no cloudiness at −5° C.

5. A method of obtaining white liquid chlorine substitution products of naphthalene, which comprises distilling an impure liquid chlorinated naphthalene having a gravity of 1.25 or less at 150° C., carrying on the distillation at a low pressure of 100 m. m. of mercury or less in the presence of sufficient of a substance acting chemically as a base to neutralize acidity, and collecting a fraction having a color lighter than 2 as described.

6. A liquid chlorine substitution product of naphthalene which exhibits no cloudiness and is transparent at −5° C. and contains up to 30% chlorine.

7. A liquid chlorine substitution product of naphthalene which exhibits no cloudiness and is transparent at −5° C.

8. A liquid chlorine substitution product of naphthalene which exhibits no cloudiness and is transparent at −5° C. and has a neutral reaction.

SANDFORD BROWN.
ERNEST R. HANSON.